United States Patent
Chi et al.

(10) Patent No.: US 6,496,832 B2
(45) Date of Patent: *Dec. 17, 2002

(54) VISUALIZATION SPREADSHEET

(75) Inventors: Ed H. Chi, Minneapolis, MN (US); John T. Riedl, St. Paul, MN (US); Joseph A. Konstan, St. Paul, MN (US); Phillip J. Barry, Hopkins, MN (US)

(73) Assignee: University of Minnesota, Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,665

(22) Filed: Oct. 20, 1998

(65) Prior Publication Data

US 2001/0049695 A1 Dec. 6, 2001

(51) Int. Cl.$^7$ .............................................. G06F 17/30
(52) U.S. Cl. ...................... 707/102; 707/100; 707/503; 707/504; 707/10; 345/419; 345/781
(58) Field of Search .......................... 707/10, 100, 503, 707/504, 509, 530, 539, 540, 102, 104.1; 345/349, 327, 333, 419, 424, 441, 522, 606, 734, 781

(56) References Cited

U.S. PATENT DOCUMENTS

| | | | |
|---|---|---|---|
| 5,072,412 A | | 12/1991 | Henderson, Jr. et al. ..... 345/346 |
| 5,093,907 A | | 3/1992 | Hwong et al. ............... 345/473 |
| 5,231,577 A | | 7/1993 | Koss ........................... 707/504 |
| 5,255,363 A | | 10/1993 | Seyler ......................... 345/507 |
| 5,416,895 A | * | 5/1995 | Anderson et al. ........... 707/503 |
| 5,463,724 A | * | 10/1995 | Anderson et al. ........... 707/503 |
| 5,515,477 A | * | 5/1996 | Sutherland .................. 128/925 |
| 5,581,678 A | | 12/1996 | Kahn .......................... 345/440 |
| 5,598,519 A | | 1/1997 | Narayanan ................... 707/504 |
| 5,604,854 A | * | 2/1997 | Glassey ....................... 345/419 |
| 5,634,133 A | | 5/1997 | Kelley ......................... 707/503 |
| 5,721,847 A | | 2/1998 | Johnson ....................... 345/333 |
| 5,768,158 A | * | 6/1998 | Adler et al. ................. 707/503 |
| 5,784,545 A | | 7/1998 | Anderson et al. ........... 707/507 |
| 5,867,154 A | * | 2/1999 | Berstis et al. ............... 345/327 |
| 6,018,497 A | * | 1/2000 | Gunasekera .................. 367/38 |
| 6,078,869 A | * | 6/2000 | Gunasekera .................. 367/69 |
| 6,112,214 A | * | 8/2000 | Graham et al. .............. 707/503 |
| 6,138,130 A | * | 10/2000 | Adler et al. ................. 707/503 |
| 6,206,036 B1 | * | 3/2001 | Loyd et al. .................. 137/338 |

OTHER PUBLICATIONS

Chuah, M.C. et al., "On the Semantics of Interactive Visualizations", Data Visualization, IEEE, pp. 29–36 (1996).

Henderson, Jr., D.A. et al., "Rooms: The Use of Multiple Virtual Workspaces to Reduce Space Contention in a Window–Based Graphical User Interface", *ACM Transactions on Graphics*, 5(3):211–243 (Jul. 1986).

(List continued on next page.)

*Primary Examiner*—Hosain T. Alam
*Assistant Examiner*—Shahid Alam
(74) *Attorney, Agent, or Firm*—Merchant & Gould, P.C.

(57) ABSTRACT

A system for analyzing data organized into data sets and for transforming the data sets into a visual representation of the data sets is provided. The system includes a memory, a first processor, and an output device. The memory is configured with a data structure for maintaining an arrangement of cells in a grid of rows and columns and for storing the data sets. The first processor is configured to map attributes of the data sets into visual representations of the data sets. The output device displays the visual representations of the data sets in the cells. A user can extract meaning from the data by visually comprehending the relationships between the data sets.

24 Claims, 7 Drawing Sheets

OTHER PUBLICATIONS

Hudson, S.E. et al., "Interactive Specification of Flexible User Interface Displays", *ACM Transactions on Information Systems*, 8(3):269–288 (Jul. 1990).

Hudson, S.E., "User Interface Specification Using an Enhanced Spreadsheet Model", *ACM Transactions on Graphics*, 13(3):209–239 (Jul. 1994).

Kandogan, E. et al., "Elastic Windows: A Hierarchical Multi–Window World–Wide Web Browser", University of Maryland, College Park, MD, pp. 169–177 (1997).

Lee, J.P. et al.., "An Architecture for Retaining and Analyzing Visual Explorations of Databases", Visualization '95 proceedings, IEEE, pp. 101–108 (1995).

Levoy, M., "Spreadsheets for Images", Computer Graphics Proceedings, Annual Conference Series, pp. 139–146 (1994).

Myers, B.A., "Graphical Techniques in a Spreedsheet for Specifying User Interfaces", School of Computer Science, Carnegie Mellon University, Pittsburgh, PA, pp. 243–249 (1991).

Piersol, K.W., "Object Oriented Spreadsheets: The Analytic Spreadsheet Package", OOPSLA '86 Proceedings, pp. 385–390 (Sep. 1986).

Rao, R. et al. "The Table Lens: Merging Graphical and Symbolic Representations in an Interactive Focus+Context Visualization for Tabular Information", CHI '94, pp. 318–322 and 481–482 (1994).

Schroeder, W.J., et. al.,"The Design and Implementation of An Object–Oriented Toolkit For 3D Graphics And Visualization", IEEE, pp. 93–100 and 472 (1996).

Spenke, M. et al., "FOCUS: The Interactive Table for Product Comparison and Selection", GMD—German National Research Center for Information Technology, Sankt Augustin, Germany, pp. 41–50 (1996).

Stadelmann, M., "A Spreadsheet Based on Constraints", *UIST '93*,pp. 217–224 (Nov. 3–5, 1993).

Tweedie, L., "Characterizing Interactive Externalizations", *Papers*, CHI 97, pp. 375–382 (Mar. 22–27, 1997).

Varshney, A. et al., "FINESSE: A Financial Information Spreadsheet", IEEE, pp. 70–71 and 125 (1996).

Wilde, N. et al., "Spreadsheet–based Interactive Graphics: from Prototype to Tool", CHI '90 Proceedings, pp. 153–159 (1990).

\* cited by examiner

VISUALIZATION SPREADSHEET

This invention was made with government support under BIR-9402380-02 awarded by the National Science Foundation. The government has certain rights in the invention.

FIELD OF THE INVENTION

The present invention generally relates to systems for analyzing data, and in particular, to systems for analyzing data where data sets are transformed into visual representations using an arrangement of cells.

BACKGROUND

The task of data analysis often involves complex data sets that are not easily comprehensible. Spreadsheets have proven to be highly successful tools for interacting with data. Typical spreadsheets can apply algebraic operations, manipulate rows or columns, and explore "what-if" scenarios, but they are limited in the complexity of information that can be manipulated. Furthermore, typical spreadsheets are limited in their graphical representations of the data. Complex data sets involve multiple data dimensions or variables that are beyond the limitations of typical spreadsheets.

Visualization techniques exist for representing various forms of complex data sets. Visualization techniques allow complex data sets to be transformed into graphical representations so that users can explore these complex data sets more easily. However, current visualization techniques are also limited. During analysis of complex data sets, it is often desirable to combine, select, or manipulate several different data sets at the same time, such as exploring different views of the data interactively, applying operations like rotation or data filtering to a view or group of views, and comparing two or more related data sets. Current visualization techniques do not support these capabilities. Accordingly, improvements in systems for analyzing complex data sets are desirable.

SUMMARY OF THE DISCLOSURE

In one aspect of the present invention, one example embodiment involves a system for analyzing data organized into data sets and for transforming the data sets into a visual representation of the data sets. The system includes a memory, a first processor, and an output device. The memory is configured with a data structure for maintaining an arrangement of cells in a grid of rows and columns and for storing the data sets. The first processor is configured to map attributes of the data sets into visual representations of the data sets. The output device displays the visual representations of the data sets in the cells. A user can extract meaning from the data by visually comprehending the relationships between the data sets.

In another aspect, the system may also include a selection module for selecting a data set, or data sets, and an operator module for selecting an algorithmic operator for manipulating the selected data set, or data sets. The system applies the selected algorithmic operator to modify the selected data set, or data sets, or generate at least one new data set.

In another aspect, the system may also include a dependency module by which the system determines dependencies between the selected data sets.

In another aspect, a method of analyzing data organized into data sets and for transforming the data sets into a visual representation of the data sets is described. The method includes maintaining an arrangement of cells in a grid of rows and columns and for storing the data sets; mapping attributes of the data sets into visual representations of the data sets; and displaying the visual representations of the data sets in the cells.

In another aspect, a computer-readable medium encoded with data representing a computer program, that can cause a computer, having memory and an output device, to analyze data organized into data sets and for transforming the data sets into a visual representation of the data sets, is described. The computer program comprising a method for maintaining an arrangement of cells in a grid of rows and columns and for storing the data sets, mapping attributes of the data sets into visual representations of the data sets, and displaying the visual representations of the data sets in the cells.

BRIEF DESCRIPTION OF THE DRAWINGS

Principles of the invention may be more completely understood in consideration of the detailed description of various embodiments of the invention that follows in connection with the accompanying drawings in which.

Figure 1:
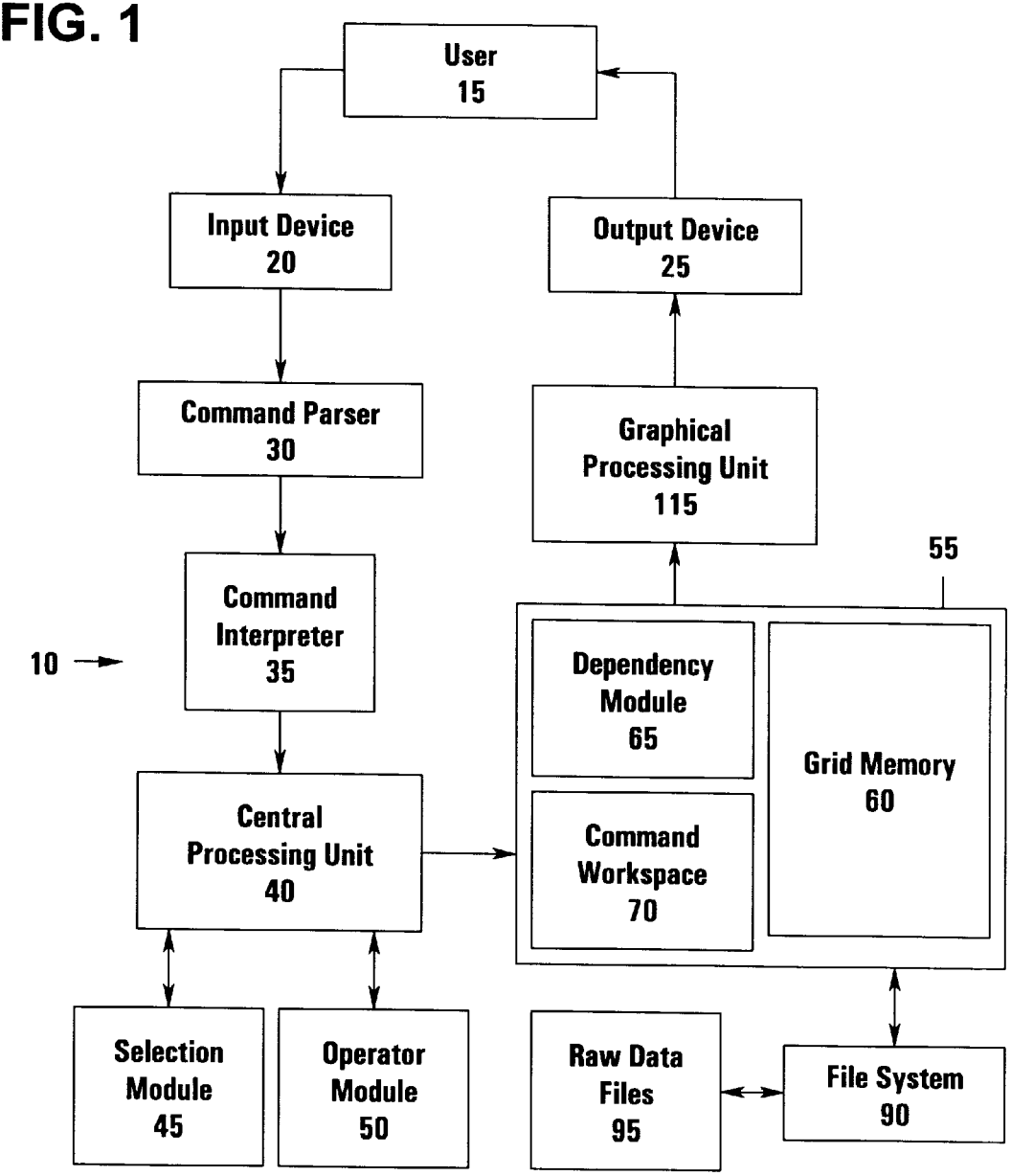
FIG. 1 is a block diagram of a system for analyzing data.

While principles of the invention are amenable to various modifications and alternative forms, specifics thereof have been shown by way of examples in the drawings and will be described in detail. It should be understood, however, that the intention is not to limit the invention to the particular embodiments shown and described. On the contrary, the intention is to cover all modifications, equivalents, and alternatives falling within the spirit and scope of the disclosure.

DETAILED DESCRIPTION

The principles described herein are believed to be applicable to a variety of systems for analyzing data. The principles of the disclosure have been found to be particularly advantageous for systems for analyzing data where data sets are transformed into visual representations using an arrangement of cells. An appreciation of various aspects is best gained through a discussion of an application example for such a system for analyzing data.

In a preferred embodiment, a system is configured for analyzing data, which is organized into data sets, and for transforming the data sets into a visual representation of the data sets. The system includes a memory system, at least one processor, and an output device. The memory system is configured with a data structure to maintain an arrangement of cells in a grid of rows and columns and for storing the data sets. A processor is configured to map attributes of the data sets into visual representations of the data sets. The output device displays the visual representations of the data sets in the cells. The system allows the user to extract meaning from the data by visually comprehending the relationships between the data sets.

In the preferred embodiment, a computer program is used to transform data sets into visual representations of the data sets. Preferably, the computer program is encoded on a computer-readable medium, such as a hard disk, a CD-ROM, or a floppy disk. The computer program may be implemented in Tcl and C++ programming languages. Alternatively, the computer program could be implemented in other programming languages. Such computer programs are designed to run on computing systems that include input devices, one or more processing systems, one or more memory systems, and output devices. Preferably, the computing system is a computer system of one or more computers and includes at least one video monitor, at least one central processing unit (CPU) with a memory system, and a keyboard or other input devices.

Attention is directed to FIG. 1., which illustrates a system 10 for analyzing data according to the preferred embodiment. A user 15 interacts with the system 10 through an input device 20 and an output device 25. In the preferred embodiment, the input device 20 includes a keyboard and a mouse. Alternatively, the input device 20 could include a head-mounted display, data gloves, voice recognition devices, a video camera, a camera, a scanner, or a tablet. In the preferred embodiment, the output device 25 includes a video display, such as a video monitor. Alternatively, the output device 25 could include a head-mounted display, multiple displays, a projector, or a holographic display.

Figure 2:
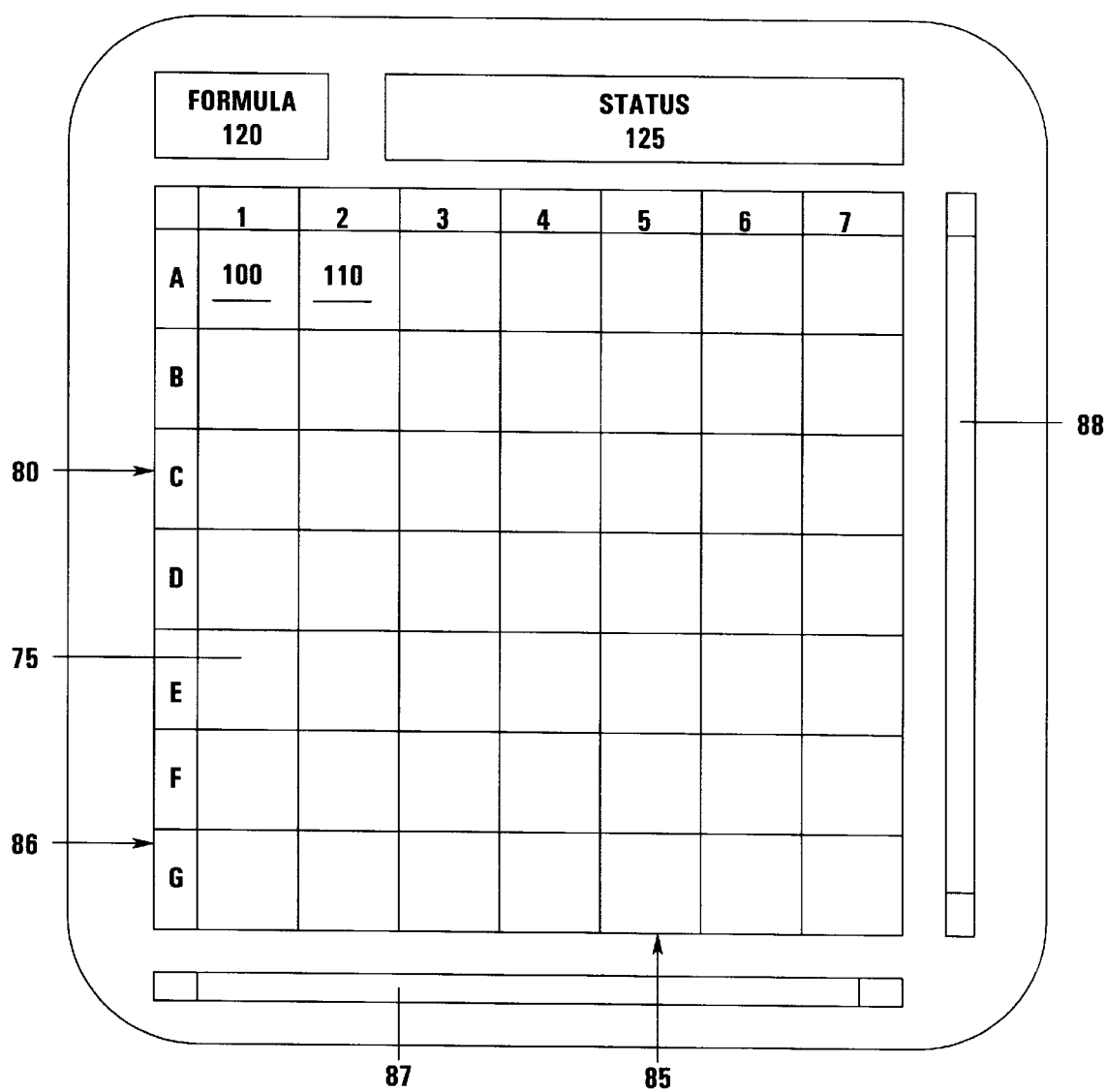
FIG. 2 is a representation of the user interface of the system of FIG. 1.

The user 15 inputs commands into the system 10 through the input device 20. Attention is directed to FIG. 2. As the user 15 (FIG. 1) inputs commands or formulas into the system 10 (FIG. 1) via the input device 20 (FIG. 1), the user 15 receives feedback of the commands or formulas via a formula entry box 120 and a status window 125 on the output device 25 (FIG. 1). The formula entry box 120 typically displays an algorithmic operator, an operand, and the result of the applicable command as it is being specified by the user 15. The status window 125 typically displays feedback of the current status of the command execution as it is being processed by a CPU.

Referring back to FIG. 1, a command parser 30 may be configured to decode the user's 15 commands that may be electronically communicated to a command interpreter 35. The command interpreter 35 electronically communicates with a CPU 40 and instructs the CPU 40 to execute commands that correspond to the command or commands that were input by the user 15. The CPU 40 typically uses a selection module 45 and an operator module 50 to select an appropriate algorithmic operator and to select appropriate cells to apply the algorithmic operator, as will be described in more detail later. The execution of the commands by the CPU 40 modifies a memory 55 of the system 10. In the preferred embodiment, the memory 55 includes a grid memory 60, a dependency module 65, and a command workspace 70.

Referring back to FIG. 2, the grid memory 60 (FIG. 1) preferably maintains a series of cells, represented generally as 75, arranged in rows 80 and columns 85. This arrangement of cells 75 or grid-like structure is commonly known as a spreadsheet 86. The number of rows 80 and columns 85 that comprise the spreadsheet 86 varies depending on the number of data sets represented. In FIG. 2, the spreadsheet 86 has seven rows 80 and seven columns 85. When the number of rows 80 and columns 85 becomes too large, typically only a portion of the rows 80 and columns 85 are displayed on the output device 25 (FIG. 1), such as one or more display monitors, for the user 15 to see. The portion that is displayed on the output device 25 may be controlled by the user 15 via first and second scrollbars 87, 88. The first scrollbar 87 allows the user 15 to move the spreadsheet 86 left or right across the output device 25. Likewise, the second scrollbar 88 allows the user 15 to move the spreadsheet 86 up or down along the output device 25. Thus, the scrollbars 87, 88 allow the user 15 to view the contents of any cells 75 within the spreadsheet 86. Such scrollbars 87, 88 are commonly known.

Typically, a single cell, such as a first cell 100, holds a single data set. The first cell 100 may also hold an associated formula. The associated formula specifies how a data set in the first cell 100 is manipulated by the CPU 40. Preferably, the contents of the first cell 100, or the data set and the associated formula, are stored in the grid memory 60 (FIG. 1). Referring back to FIG. 1, in the preferred embodiment, the system 10 reads the data set from a file system 90, which in turn accesses raw data files 95 containing the data.

In the present system, each cell 75 may be configured by the computer program to display a graphical representation or visualization of the data set contained therein. The grid layout of the spreadsheet 86 enables the user 15 to view collections of visualizations of data sets simultaneously. However, each cell 75 can also occupy its own display window for viewing finer details. The grid layout of the spreadsheet 86 has a number of advantages. First, it enables the user 15 to enter data into cells 75 in various configurations. Second, because of the spreadsheet's 86 easy to comprehend structure, it is easy to navigate through the cells 75. Third, because the spreadsheet 86 affords easy grouping, operations can be defined on rows 80 and columns 85, or portions of the spreadsheet 86.

In the present system, the memory 55 is typically configured by the computer program to store dependencies or relationships between cells 75 in the dependency module 65. Referring back to FIG. 2, by the term "dependencies," it is meant that a first cell, for example the first cell 100, is related to a second cell, for example a second cell 110. For example, a dependency may exist stating that the second cell 110 is equal to the first cell 100 scaled two times larger. Of course, numerous other dependencies could be established. For example, a formula "AddRandom3DPoint 100 50" is stored within the second cell 110. Through this reference, the second cell 110 is linked to the value of the first cell 100 by adding fifty new random three-dimensional points to the first cell 100.

Figure 3:
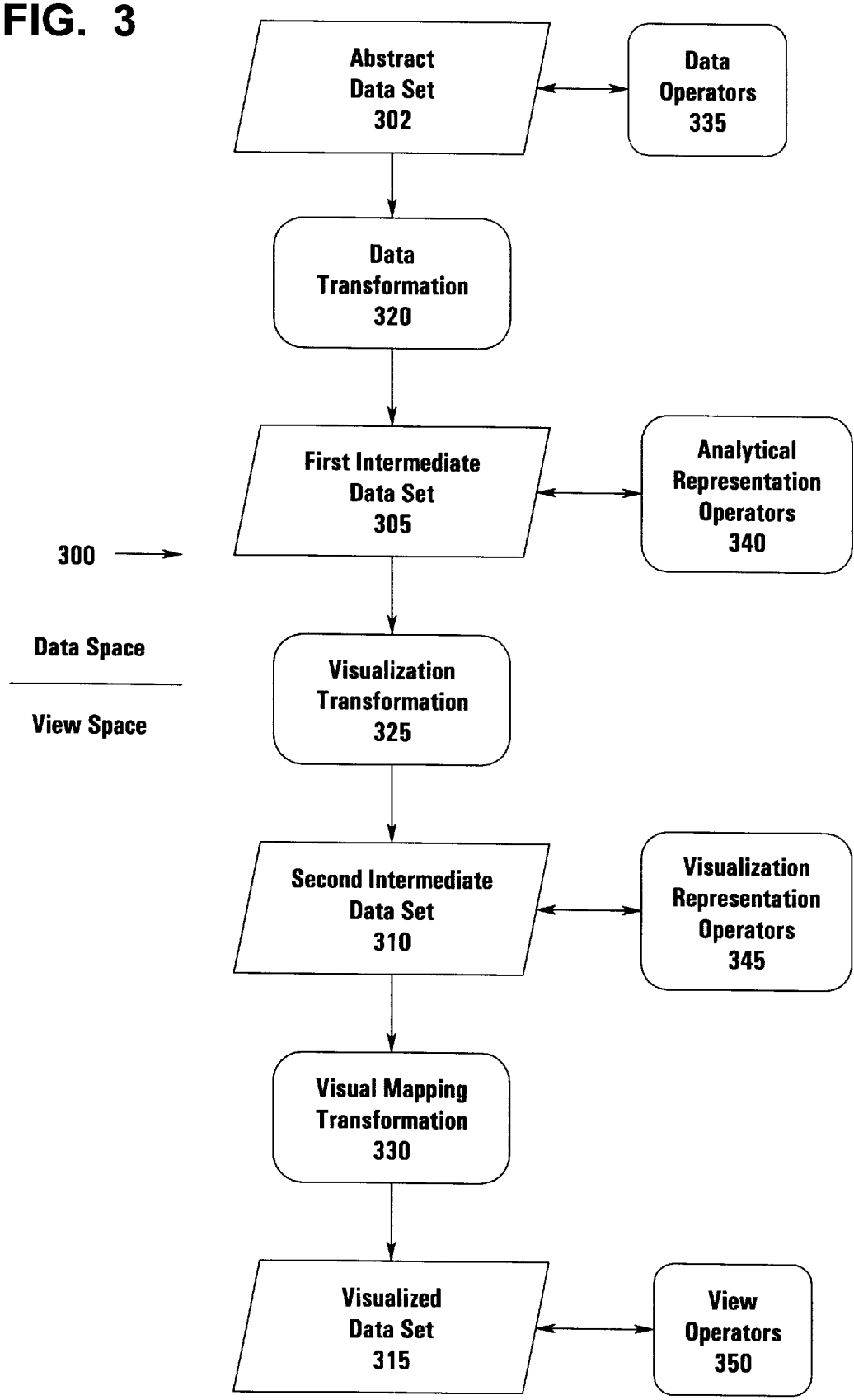
FIG. 3 is a flow diagram illustrating a process of generating a visualized data set in a cell using the system of FIG. 1.

Attention is directed to FIG. 3. In the preferred embodiment, the data sets can include abstract data sets 302, or values; intermediate data sets 305, 310, or analytical representations and visualization representations, respectively; visualized data sets 315, or views; or any combination thereof. By the term "abstract data sets," it is meant data sets that are unprocessed and where immediate mappings from raw data attributes to displayable content are not obvious. By the term "mapping," it is meant that the raw data attributes are associated to displayable graphical elements on the output device 25 (FIG. 1). These abstract data sets 302 require the information to be transformed into intermediate data sets 305, 310. By the term "intermediate data sets," it is meant data sets that have been partially processed by the CPU 40 but are not ready for immediate display. By the term "visualized data sets," it is meant the partially processed data sets, or intermediate data sets 305, 310, that are further processed by the CPU 40 for immediate display. The intermediate data sets 305, 310 are mapped graphically into visualized data sets 315, which the system 10 (FIG. 1) transforms into images that are displayable on the output device 25. In other words, the system 10 transforms the abstract data sets 302 into visualized data sets 315 that are visualized for the user 15 (FIG. 1).

Referring back to FIG. 1, the command workspace 70 stores the first intermediate data set 305 (FIG. 3) that is generated during computation by the CPU 40. In other words, the CPU 40 has processed the abstract data set 302 (FIG. 3), read from the file system 90, into the first intermediate data set 305 contained in the command workspace 70 by executing commands that were input into the system 10 by the user 15 through the input device 20. Likewise, the command workspace 70 stores the second intermediate data set 310 (FIG. 3) that is generated during computation by the CPU 40. In other words, the CPU 40 has processed the first intermediate data set 305 into the second intermediate set 310 contained in the command workspace 70 by executing commands that were input into the system 10. The memory 55 electronically communicates the second intermediate data set 310 from the command workspace 70 to a graphical processing unit 115. The graphical processing unit 115 further processes the second intermediate data set 310 into a visualized data set 315 (FIG. 3), which is ready for immediate display. The graphical processing unit 115 electronically communicates the visualized data set 315 to the output device 25 for display to the user 15. The user 15 receives feedback from the output device 25, enabling the user 15 to extract meaning about the data sets in the cells 75 (FIG. 2).

Figure 4:
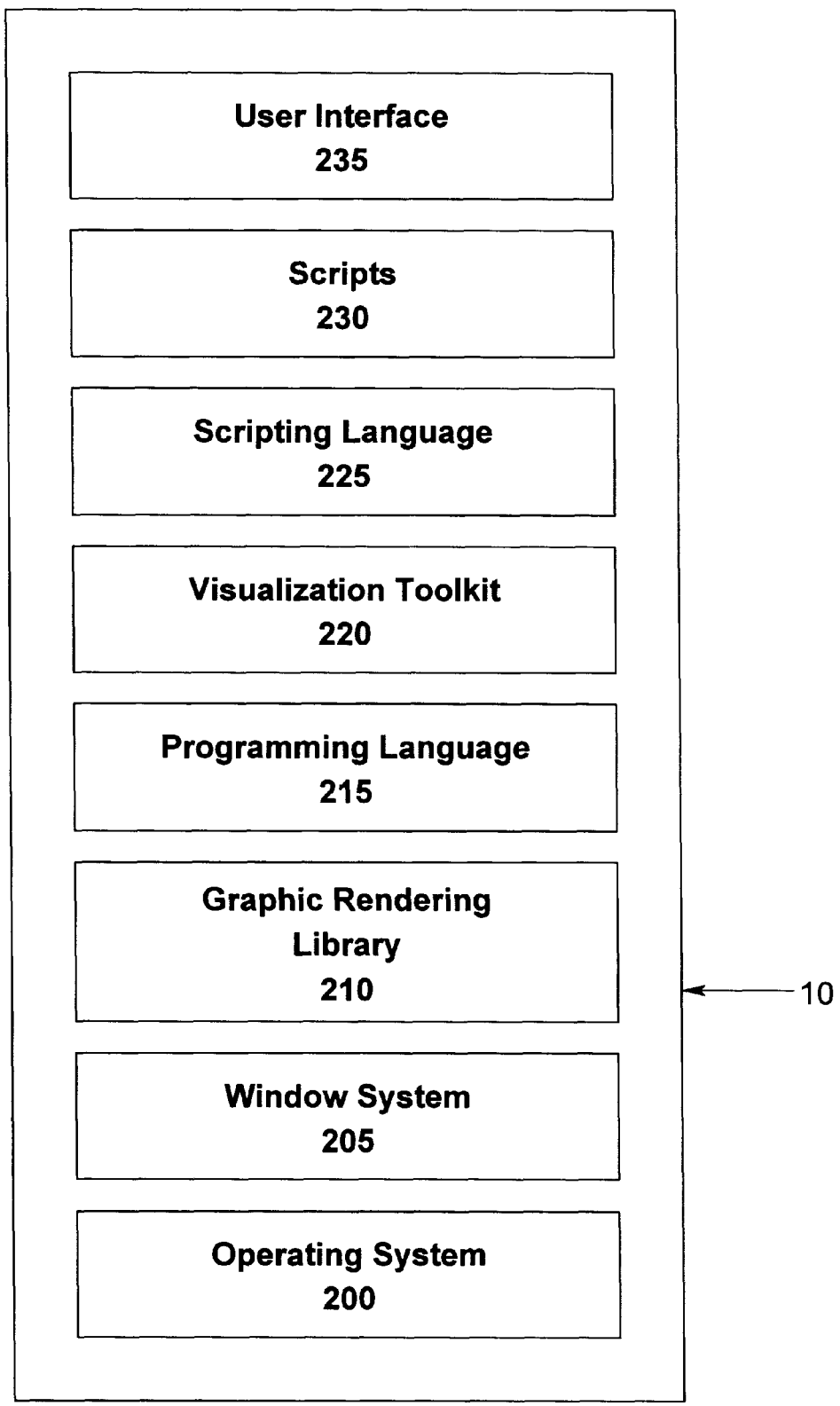
FIG. 4 is a block diagram of an architecture for the system of FIG. 1.

Attention is directed to FIG. 4. FIG. 4 illustrates an arrangement of the system 10 according to the preferred embodiment. Preferably, the system 10 utilizes an operating system 200 and a window system 205. The operating system 200 controls the basic functions of the system 10. The window system 205 provides an interface between the operating system 200 and the application software running on the system 10, making the system 10 more user friendly. The window system 205 enables the system 10 to manage several display windows in the output device 25 (FIG. 1) simultaneously. The system 10 also utilizes a graphic rendering library 210, such as the OpenGL library available from Silicon Graphics, Incorporated. The graphic rendering library 210 interacts with the window system 205 to enable the system 10 to display two-dimensional (2D) and three-dimensional (3D) graphics. Preferably, the system 10 uses a programming language 215, such as C++, to access various functionalities of the operating system 200, the window system 205, and the graphical rendering library 210. Of course, in alternate embodiments any programming language could be used.

The system 10 utilizes a visualization toolkit 220, such as VTK, which is commonly known. The visualization toolkit 220 provides various visualization commonly known rendering techniques. The system 10 further utilizes a scripting language 225, such as the Tcl/Tk language, which is commonly known. The scripting language 225 enables the user 15 (FIG. 1) and a programmer (not shown) to interact with the system 10 using higher-level programming constructs than a complex lower-level language, such as C++, would allow. The system 10 contains numerous commands and procedures by way of scripts 230. The scripts 230 are written in the scripting language 225 and allow the user 15 to access "often-used" commands and procedures without having to write them herself in the scripting language 225. The user 15 interacts with the system 10 via a user interface 235, such as FIG. 2 generally illustrates, that is presented on the output device 25 (FIG. 1) to the user 15 directly.

The system 10 uses algorithmic operators to manipulate the contents of a cell 75 (FIG. 2). By the term "manipulate," it is meant that the algorithmic operator is used to modify a selected data set contained within a cell 75 or to generate at least one new data set. The complexity of the data sets means there is rarely a straightforward mapping from the attributes of the data sets, or abstract data sets 302 (FIG. 3), to a visualized form of the data sets, or a visualized data set 315 (FIG. 3). Intermediate data sets 305, 310 (FIG. 3) are generated from the abstract data sets 302, then visualized data sets 315 are created from these intermediate data sets 305, 310. One advantage of the spreadsheet approach to visualization is that the user can put these intermediate results in the cells 75 to monitor the progress of the computation. The spreadsheet approach makes intermediate operands of the data analysis processing steps viewable.

Referring back to FIG. 3, preferably, the algorithmic operators are categorized into seven classes of algorithmic operators, including: data transformation operators, visualization transformation operators, visual mapping transformation operators, data operators 335, analytical operators 340, visualization operators 345, and view operators 350. Each class of algorithmic operators includes a variety of individual algorithmic operators. For example, the class of data operators 335 includes individual operators for selecting a subset of a data set and for the addition of two data sets. Likewise, data transformation operators include operators for creating text vectors and extracting linkage information from graphs. Analytical representation operators include an operator for adding random noise. Visualization transformation operators include operators for dimension reduction and clustering. Visualization representation operators include operators for creating hierarchies among clusters of documents. Visual mapping transformation operators include operators for the Cone Tree and Disk Tree, which are commonly known. View operators include operators for rotation, translation, and scaling. Of course, many other operators are known that may be utilized by the system 10.

In the preferred embodiment, the algorithmic operators operate along a data-flow pipeline network as illustrated generally at 300. The abstract data set 302 is the unprocessed data set that contains data attributes of the information for analysis in the system 10 (FIG. 1). Preferably, the abstract data set 302 is first processed by the CPU 40 (FIG. 1) into some form of analytical representation or first intermediate data set 305 through a data transformation process 320. In the data transformation process 320, the CPU 40 applies data transformation operators to the abstract data set 302, transforming the abstract data set 302 into the first intermediate data set 305. This first intermediate data set 305 is further processed by the CPU 40 into some form of a visualization representation or second intermediate data set 310 using a visualization transformation process 325. In the visualization transformation process 325, the CPU 40 applies visualization transformation operators to the first intermediate data set 305, transforming the first intermediate set 305 into the second intermediate data set 310. The visualization transformation process 325 typically contains a dimension reduction step, because the data sets in information visualization are complex and multi-dimensional. An example of visualization transformation is multi-dimensional scaling and data clustering that are commonly known. The second intermediate data set 310 is further processed by the graphical processing unit 115 (FIG. 1) into a visualized data set 315 using a visual mapping transformation process 330. In the visual mapping transformation process 330, the graphical processing unit 115 applies visual mapping transformation operators to the second intermediate data set 310, transforming the second intermediate set 310 into the visualized data set 315. The visualization network 300 supports as many values (abstract data sets 302) and as many views (visualized data sets 315) as needed.

The data operators 335, the analytical operators 340, the visualization operators 345, and the view operators 350 take information from the abstract data set 302, the first intermediate data set 305, the second intermediate data set 310, and the visualized data set 315, respectively; generate the same type of information; and feed the generated information back into the network 300. For example, the view operator 350, which contains numerous operators such as a rotation operator, takes the visualized data set 315, rotates it, generates another visualized data set 315, and feeds the new visualized data set 315 back to the network 300. Thus, a user 15 is able to rotate a visualized data set 315 within a cell 75 (FIG. 2).

In alternative embodiments, the first intermediate data set 305 is not needed, because after one transformation, the intermediate data set may already be in the form of the second intermediate data set 310. In these embodiments, the pipeline network 300 collapses to only three levels of data sets: the abstract data set 302, the second intermediate data set 310, and the visualized data set 315.

Referring back to FIG. 1, the user 15 specifies which algorithmic operator, or operators, to use via the user interface 235 (FIG. 4) to the system 10. The CPU 40 electronically communicates with the operator module 50 to select an algorithmic operator, or operators, for manipulating a data set contained within a cell 75.

Referring back to FIG. 2, in the preferred embodiment the spreadsheet 86 includes a variety of algorithmic operators for different types of abstract data sets 302 (FIG. 3). The algorithmic operators can be applied across a specified range of operand cells 75, such as a whole column 85. For example, a data operator 335 (FIG. 3), such as an addition operator, takes columns 85, rows 80, or a subgroup of cells 75 as operands. The application of an algorithmic operator is in the form of a formula. The formula syntax is "operator result operands." In the preferred embodiment, each algorithmic operator is implemented as a function in a computer program, that takes operands as input, and generates output that is assigned to the result.

Preferably, the system 10 (FIG. 1) automatically infers relationships between cells 75 by examining the algorithmic operators that compute the visualized data sets 315 (FIG. 3) for the cells 75. A dependency relationship arises from each cell 75 that an algorithmic operator uses as an operand, for example the first cell 100, and to each cell 75 that the algorithmic operator uses as a target, for example the second cell 100. Using the previously used dependency example, the algorithmic operator "AddRandom3DPoint" relates the first and second cells 100, 110 together in a dependency relationship where the first cell 100 is the source cell and the second cell 110 is the target cell. When the first cell 100 changes, the second cell 110 changes automatically.

There are different types of dependency relationships. For example, some dependency relationships relate two abstract data sets to each other, while another type of dependency relationship may relate an abstract data set to a visualized data set. The class of the dependency depends on the class of the algorithmic operator. For example, if the algorithmic operator operates on an abstract data set 302 (FIG. 3), then the dependency relationship between the cells 75 occurs at the abstract data set 302 level. If, on the other hand, the algorithmic operator operates on abstract data sets 302 and generates a visualized data set 315 (FIG. 3), then the dependency relationship between the cells 75 relate the abstract data set 302 of the first cell 100, or operand cell 100, with the visualized data set 315 of the second cell 110, or the target cell 110. These different classes of dependency relationships are illustrated by the visualization network model represented in FIG. 3. The dependency relationships are modeled between data sets by modeling the state of a data set as a node in a visualization network. The application of algorithmic operators can then change these states. The specification of the algorithmic operator also specifies the dependency relationship between the data sets.

An associated formula may contain multiple references to other cells 75. In the preferred embodiment, the spreadsheet 86 maintains the dependencies between cells 75 in the dependency module 65 (FIG. 1) in the memory 55 (FIG. 1), and automatically updates the cells 75 appropriately when they are manipulated by the system 10. When a cell 75 is selected, its dependency relationships appear in the formula entry box 120. In alternative embodiments, the dependencies can be computed as needed from the algorithmic operators.

The dependency relationships between cells 75 and the definition of the algorithmic operators are complex, because unlike traditional numeric spreadsheets, the underlying data in the system 10 is larger and more complex than a single number. In the preferred embodiment, a framework for specifying the dependency relationships between cells 75 at different levels of data representation is used. During the computation of the algorithmic operators, the intermediate data sets 305, 310 (FIG. 3) are stored in the command workspace 70 (FIG. 1). Each algorithmic operator looks up the corresponding data set from the command workspace 70 as operands, and generates a result. The result is returned to the command workspace 70, and assigned to a cell 75 within the grid memory 60.

Figure 5:
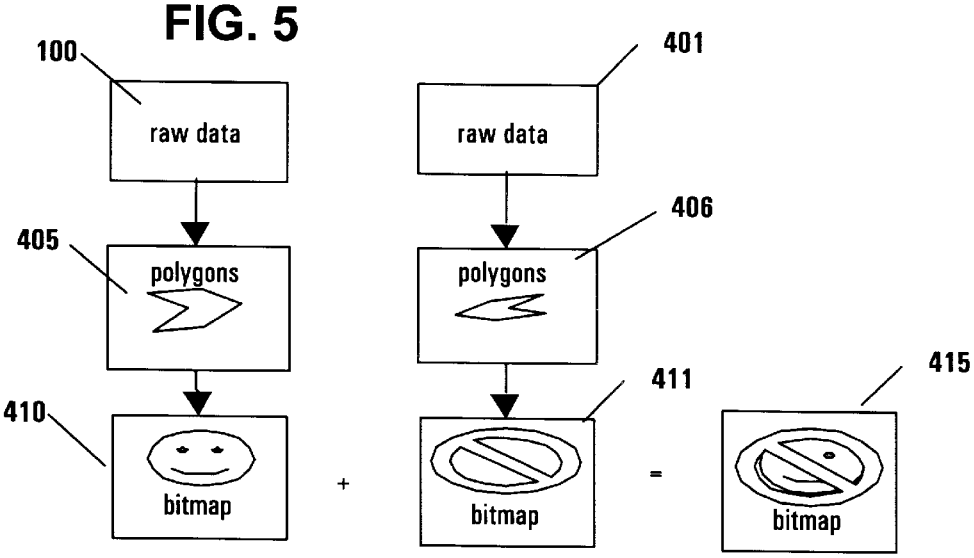
FIG. 5 is a representation of an algorithmic operator used by the system of FIG. 1.

Attention is directed to FIG. 5. FIG. 5 illustrates a view operator 350 (FIG. 3), such as an addition operator, at different levels of the visualization network 300 (FIG. 3). FIG. 5 illustrates an addition operator that operates at the view level, where the pixel values are determined. Two abstract data sets 400, 401 are transformed by the CPU 40 (FIG. 1) into two intermediate data sets 405, 406, respectively. The graphical processing unit 115 (FIG. 1) transforms the intermediate data sets 405, 406 into two visualized data sets 410, 411, respectively. Applying the algorithmic operator, the system 10 (FIG. 1) adds these visualized data sets 410, 411 pixel by pixel to generate a new visualized data set 415.

Figure 6:
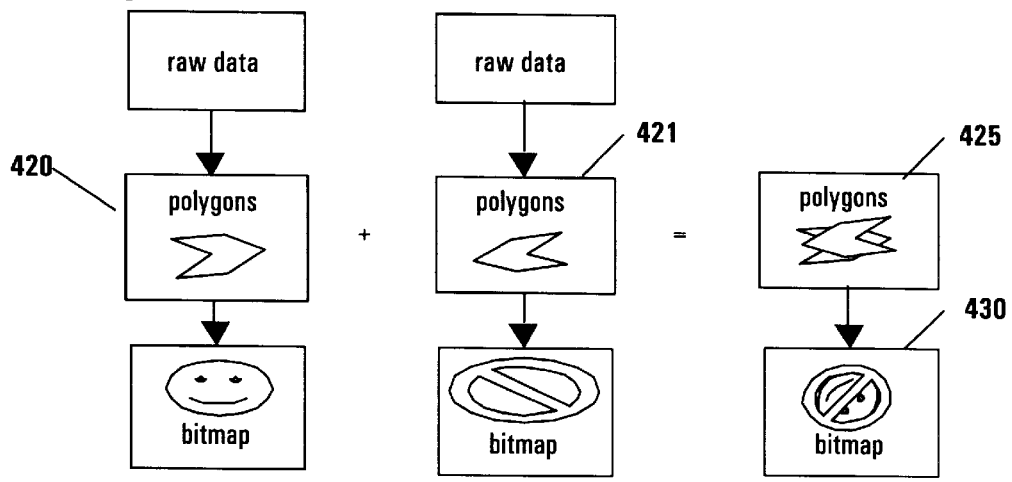
FIG. 6 is a representation of another algorithmic operator used by the system of FIG. 1.

Attention is directed to FIG. 6. FIG. 6 illustrates a visualization representation operator 345. The system 10 (FIG. 1) applies the visualization operators 345 to add two polygon intermediate data sets 420, 421 to form a new polygon intermediate data set 425. The graphical processing unit 115 (FIG. 1) transforms the intermediate data set 425 into a visualized data set 430. Because the system 10 processes the information at the polygon level, the user 15 (FIG. 1) can rotate the geometric content.

Figure 7:
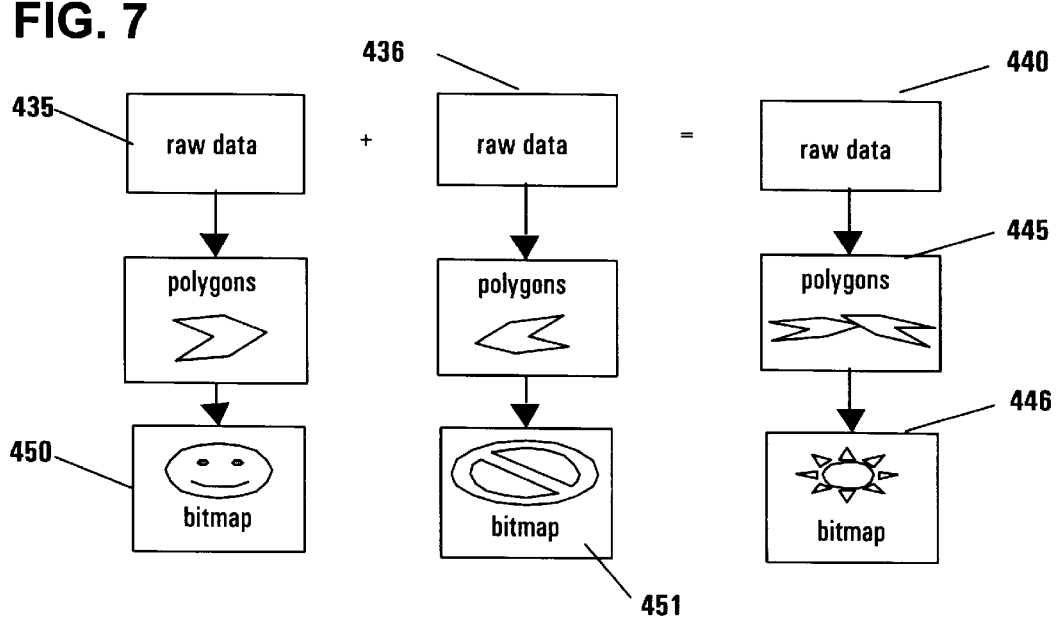
FIG. 7 is a representation of yet another algorithmic operator used by the system of FIG. 1.

Attention is directed to FIG. 7. FIG. 7 illustrates a data operator 335. The system 10 (FIG. 1) applies the data operator 335 to add two abstract data sets 435, 436 together to form a new abstract data set 440. The new abstract data set 440 is then processed by the CPU 40 (FIG. 1) into a new set of polygons 445, and a new visualized data set 446 is generated. Because the underlying data sets 435, 436 are changed dramatically, the visualization algorithm may produce a view 446 that is significantly different from the views 450, 451 generated from the two original abstract data sets 435, 436.

Figure 8:
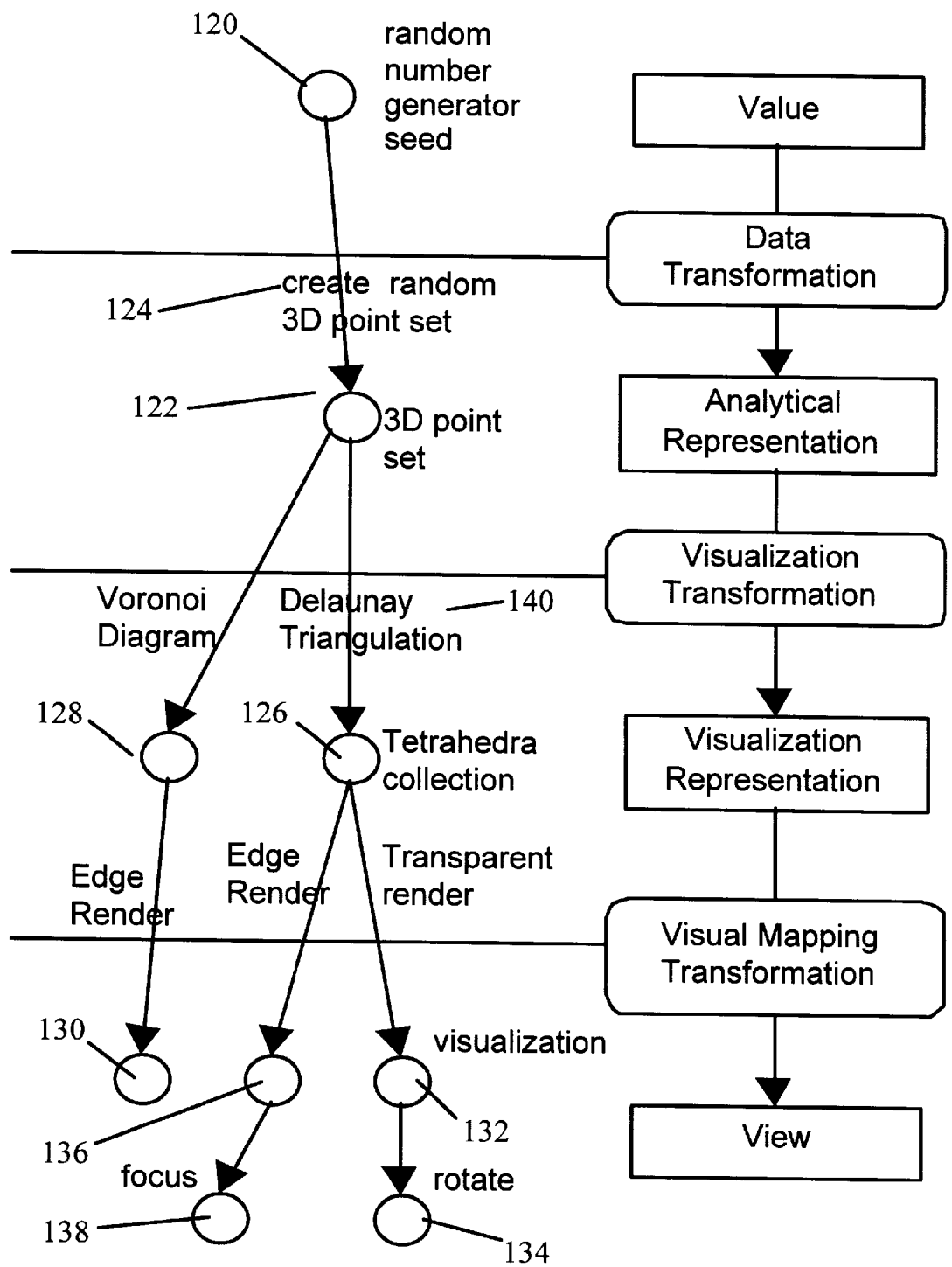
FIG. 8 is a flow diagram illustrating an example application of the system of FIG.1.
Figure 9:
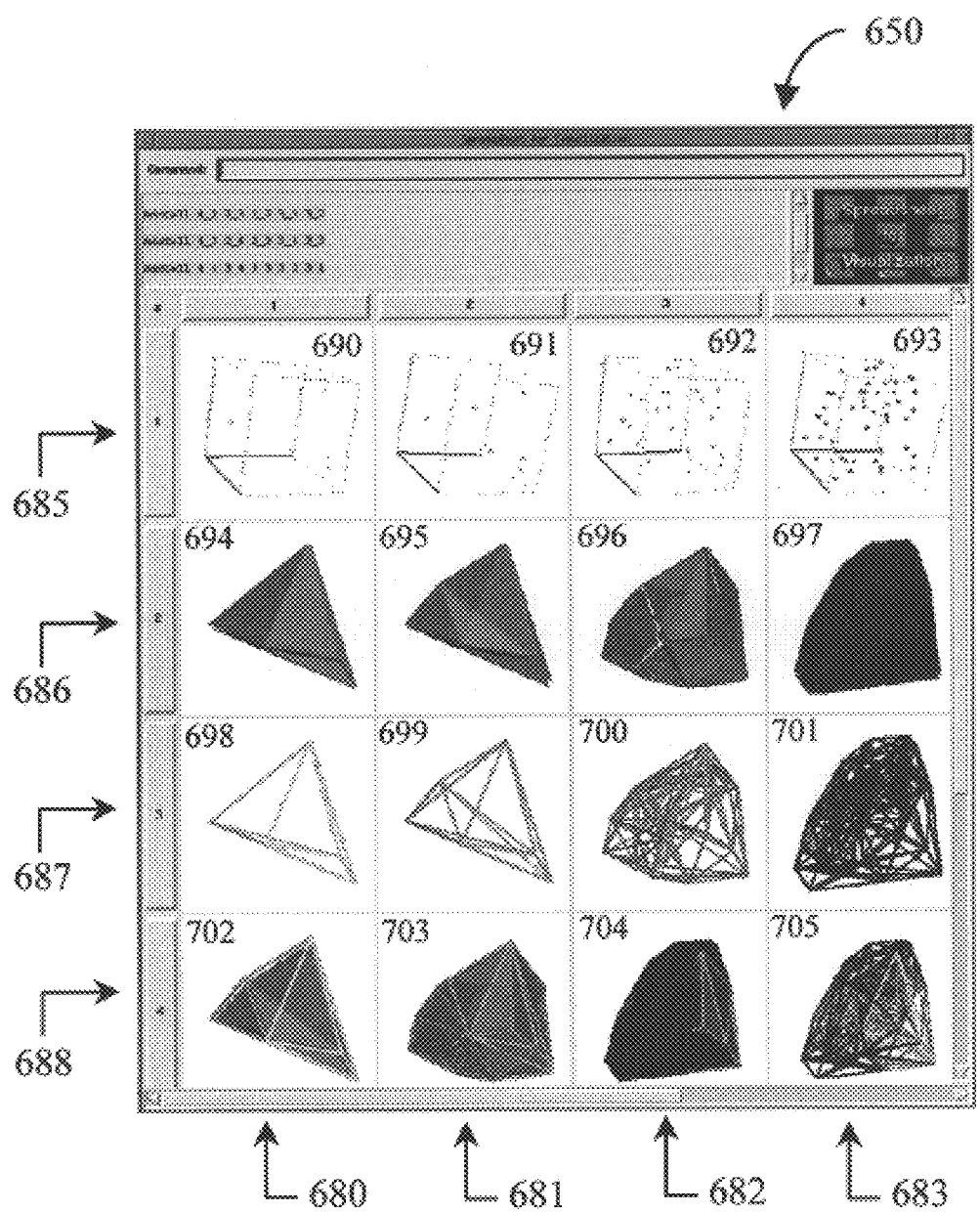
FIG. 9 is a sample screen display illustrating the results of commands producing visualizations of data sets using an example application of the system of FIG. 1.

The operations of the system 10 are best illustrated by the examples shown in FIGS. 8 & 9. The domain for this example is algorithm visualization. A spreadsheet 86 (FIG. 2) is used to easily construct both animations and tabular layouts of steps for a 3D Delaunay triangulation algorithm, which is a well known computational geometry algorithm. The 3D Delaunay triangulation is an example of how algorithm visualization is supported by the system 10.

The algorithm generates 3D random points using random number generators, and then forms tetrahedra from the points using a well-known algorithm in computational geometry called Delaunay triangulation. Delaunay triangulation has been used in scientific and information visualization domains to generate structures around points. 2D Delaunay triangulation is an optimal triangulation and has a number of interesting properties, such as maximizing the minimum angles. However, 3D Delaunay triangulation is much more complicated than 2D triangulation. Even though the problem of 3D triangulation is well studied, it is still non-intuitive for many people; so, visualization techniques can help in gaining better insights into the algorithm.

FIG. 8 shows an example of a simple visualization network 500 for generating a visualization. This example applies the system 10 to show how the visualization pipeline takes data sets, generates intermediate results, and creates a visualized view of the data set. This example consists of a random number generator that takes a seed number 502 to start its operation. Using this random number generator, the "MathRandom3D" operator 504 creates 3D pointsets 506. The Delaunay triangulation operator 508 creates a tetrahedra collection 510, that is transparently rendered into a visualization 512. FIG. 8 illustrates that this same tetrahedra collection 510 can also be edge rendered into a different visualization 514. The system 10 applies different view operators to these visualizations 512, 514 to create new views 516, 518. Alternatively, a different algorithm could have been applied to the point set to generate a Voronoi diagram 520 that can be edge rendered to create a different visualized view 522. Each node in the visualization network 500 is a state that can be changed by the application of an algorithmic operator, which specifies the command to execute to compute the desired result and creates the dependency relationships between data sets.

In the example, the user 15 (FIG. 1) inputs the following four commands into the input device 20 (FIG. 1) to generate 4 different data sets (pset1, pset2, pset3, pset4):

MathRandom3D pset1 100 5
AddRandom3D pset2 pset1 1
AddRandom3D pset3 pset2 19 AddRandom3D pset4 pset3 25

Using the first command, the system 10 generates five random 3D points and labels it 'pset1' using a random number generator seeded with the value 100. Using the second command, the system 10 creates a second point set 'pset2' from the first 'pset1' by adding one more random point. Using the third command, the system 10 generates 'pset3' by adding 19 points to 'pset2'. Using the fourth command, the system 10 generates 'pset4' by adding 25 points to 'pset3'.

Attention is directed to FIG. 9. FIG. 9 illustrates the spreadsheet 650 loaded with this example data. First, second, third, and fourth cells 690, 691, 692, 693 of the spreadsheet 650 show the results of the algorithm after 5, 6, 25, and 50 points have been generated across columns 680, 681, 682, 683, from left to right respectively. The first row 685 shows the point set using 3D scatter plots. The system 10 generates scatter plots by using the following commands:

Scatter sca1 pset1 $yellow
Scatter sca2 pset2 $green
Scatter sca3 pset3 $peacock
Scatter sca4 pset4 $red
AddValue 1__1 sca1
AddValue 1__2 sca2
AddValue 1__3 sca3
AddValue 1__4 sca4

The first command, for example, causes the system 10 (FIG. 1) to use the scatter operator to generate a scatter plot view called 'sca1' from the raw data value 'pset1'. The first command also indicates to the system 10 that it should use yellow colored balls. The next three commands cause the system 10 to generate the scatter plots for 'pset2', 'pset3', and 'pset4' respectively. The AddValue commands cause the system 10 to take these scatter plots and place them into the cells 690, 691, 692, 693, respectively.

In a second row 686, the user 15 has executed the 3D Delaunay triangulation algorithm on the point sets, represented in the cells 690, 691, 692, 693, by the following commands:

Delaunay3D tri1 pset1 $yellow
Delaunay3D tri2 pset2 $green
Delaunay3D tri3 pset3 $peacock
Delaunay3D tri4 pset4 $red
AddValue 2__1 tri1
AddValue 2__2 tri2
AddValue 2__3 tri3
AddValue 2__4 tri4

The first command in this series causes the system 10 (FIG. 1) to generate a triangulation 'tri1' from point set 'pset1' and assign the tetrahedra the color yellow. The command "AddValue 2__1 tri1" causes the system 10 to place the 'tri1' triangulation result into a fifth cell 694. The other commands cause the system 10 to operate on 'pset2', 'pset3', and 'pset4', generate 'tri2', 'tri3', and 'tri4', and place them into sixth, seventh, and eighth cells 695, 696, 697, respectively.

After these commands, the user 15 shows the tetrahedra using a different method. The tetrahedra are shown using edges between vertices in a third row 687 of the spreadsheet 650. The following commands were executed to generate these views:

TubeEdge tube1 tri1 $yellow
TubeEdge tube2 tri2 $green
TubeEdge tube3 tri3 $peacock
TubeEdge tube4 tri4 $red
AddValue 3__1 tube1
AddValue 3__2 tube2
AddValue 3__3 tube3
AddValue 3__4 tube4

The first command causes the system 10 (FIG. 1) to generate the edges using the 'TubeEdge' operator, that takes a polygon list such as 'tri1' and generates tubes along each of the edges of the polygons in the list. 'AddValue 3_1 tube1' causes the system 10 to put the 'tube1' result into a ninth cell 698. The other commands cause the system 10 to operate on 'tri2', 'tri3', and 'tri4', generate the edges 'tube2', 'tube3', and 'tube4', and put them into twelfth, thirteenth, and fourteenth cells 699, 700, 701, respectively.

The user 15 examines the intricate relationships between the different results from successive steps. To do this, the user 15 adds several cells together to form a new visualization. The following commands are input into the system:

AddCell 4_1 3_2 3_1 2_2 2_1
AddCell 4_2 3_3 3_2 2_3 2_2
AddCell 4_3 3_4 3_3 2_4 2_3

The first command causes the system 10 (FIG. 1) to add the geometric contents in the fifth, sixth, tenth, and eleventh cells 694, 695, 698, 699 together and put the result into a thirteenth cell 702. The other two commands follow the same pattern and cause the system 10 to generate results for fourteenth and fifteenth cells 703, 704.

The user 15 interprets that the difference between each successive step of the generation of the 3D random points produces a larger polyhedron as viewed in the fifthteenth cell 682. This prompts the user 15 to input an additional command to add all of the triangulations together to form a new visualization:

AddCell 4_4 3_4 3_3 3_2 3_1;

The command causes the system 10 (FIG. 1) to add the geometric contents in all of the cells in the third row 687, produce a single content, and place the result into a sixteenth cell 705. The user 15 determines that each successive step generates a larger and larger polyhedron. This user 15 discovery makes an observation about the Delaunay triangulation algorithm—with each additional point added to the set, the resulting triangulation can only increase not decrease. This is a well known result in computational geometry.

In the operation of the spreadsheet 86 (FIG. 2), the system 10 (FIG. 1) keeps the declaration of relationships between the cells 690–705 in the dependency module 65 of the memory 55. Whenever the system 10 notices a change in a cell 75 (FIG. 2) that affects other cells 75, the system 10 executes the corresponding commands that formed the dependency relationships to keep the relationship up-to-date in the dependency module 65. The partial results of the computation are stored in the command workspace 70 in the memory 55. The system 10 automatically keeps these data sets up-to-date, freeing the user 15 to focus on the analysis of the data sets.

The system 10 is believed to be useful for a variety of data sets. Depending on the data sets, the system 10 implements different algorithmic operators and uses different dependencies. The following are examples of data domains and associated algorithmic operators for which the system 10 is believed to be useful.

Dynamic Querying

Abstract data sets: Home sales data and Movies sales data
Analytical representation operators (ARO): parsed feature records
Visualization transformation operators (VTO): multidimensional point sets
Visualization representation operators (VRO): dynamic value filtering
Visual mapping transformation operators (VMTO): scatter plot, choosing variables-to-axes mappings
View operators: dynamic view-filtering Alignment Viewer Abstract data sets: similarity textual reports from comparing a single sequence against a database of many other sequences
Data operators (DTO): parsing textual reports
ARO: alignment records (data structure representing parsed information)
DTO: addition, subtraction between different reports, unmapped variable value filtering
VTO: information extraction from records
VSO: feature point set with vector
VMTO: comb—glyphs
VO: rotation, zoom, focus on a single alignment, detail-on-demand, animation (by using an iterator over the view—filtering operation)

Parallel Coordinates

Abstract data sets: production run of VLSI chip yield and its defect parameters
ARO: corresponding yield and parameter feature set
VTO: choosing a subset of records using dynamic value filtering
VRO: point set
VMTO: parallel coordinate plot
VO: dynamic view—filtering SeeNet Abstract data sets: phone calls made, Internet packet flows, Email communication patterns
ARO: parsed records of source and destination and associated feature sets
VTO: unmapped variable value filtering, choice of displayed statistics, record aggregation
VRO: graph network
VMTO: matrix display, geographical link maps, node maps
VO for all three views: sound feedback, unmapped variable view filtering
VO for nodemaps and linkmaps: size, color, zoom parameter focusing, identification by brushing, animation speed, line thickness, line length, dynamic query threshold view slider
VO for nodemaps: symbol size, color sensitivity view slider
VO for matrix display: time and threshold view slider, permute rows and columns ThemeScape and Galaxies Abstract data set: CNN news stories
ARO: text vectors
VTO: choose an item and then perform weighted query
VRO: multidimensional scaling, principal component analysis
VMTO: hills and valleys
VO: zoom, rotate, focus on spot
VO for ThemeScape: slices
VO for Galaxies: animation of scatter plot Hierarchical Techniques: Cone Tree, Hyperbolic Browser, TreeMap, DiskTree Abstract data set: file system, organization charts, web structure
ARO: graph
VTO: dynamic value filtering
VRO: breadth first traversal
VRO: Tree hierarchy
VMTO: 3D cone layout and hyperbolic tree layout, Disk layout of tree
VO: focus node, hide subtree, orientation and position of tree, dynamic level filtering Perspective Wall Abstract data set: daily work schedule, file system
ARO: parsed record set
ARO: dynamic value—filtering
VRO: linear list with item features
VMTO: wall panels in 3D with glyphs, focus+context distortion—based
VO: focus on a particular wall, focus an item, dynamic view—filter, different levels of detail WebBook and WebForager Abstract data set: URLs for web pages
ARO: Images of HTML pages generated by getting the web pages
VRO: linear page lists, collection of page lists.
VRO: aggregation into a book or a pile, place on book shelf (creating list of lists), crawl from a URL and create a book from the collection
VMTO: books with multiple pages, Document Lens, bookshelf, table, piles
VO: focus on a book, focus on a page, flip through pages in a book, view as a Document Lens, history pile Table Lens Abstract data set: baseball player statistics
ARO: numeric records
ARO: sort
VRO: constructed numeric table
VMTO: number represented using bars, with focus+context distortion—based table
VO: change distortion focus Time Tube Abstract data set: web structure evolving over time
ARO: evolving graph represented as ordered collection of graph
VTO: breadth first traversal with global node position over time
VRO: evolving tree as ordered list of trees
VMTO: Time Tube represented using an aggregation of Disk Trees (invisible tube—like shelf)
VO: gestures for focus on a slice, bring slices back into the Time Tube, right-click for zooming focus on the connectivity of a node, rotate slices, brushing on pages by highlight URL on all slices, animation through the slices Spreadsheet for Images Abstract data set, analytical and visualization representation, and visualized data set: pixels, voxels
DO: rotate image, filter, change color scale
VO: images from pixels, volumes from voxels (direct mapping from data to view)
VO: rotate image, filter, change color scale, rocking the volume visualization The above specification and examples are believed to provide a complete description of the manufacture and use of particular embodiments of the invention. Many embodiments of the invention can be made without departing from the spirit and scope of the invention.

We claim:

1. A system for organizing data into data sets for transforming the data sets into a visual representation of the data sets, the system comprising:
   a) a memory configured with a data structure for maintaining an arrangement of cells in a grid of rows and columns and for storing the data sets, wherein a data set is stored in a single cell;
   b) a first processor configured to map attributes of the data sets into visual representations of the data sets; and
   c) an output device for displaying the visual representations of the data sets in the cells;
   d) whereby a user can extract meaning from the data by visually comprehending the relationships between the data sets.

2. A system according to claim 1, wherein the data sets are selected from the group of:
   a) abstract data sets comprising unprocessed data sets;
   b) intermediate data sets comprising abstract data sets that are partially processed by the first processor but are not ready for immediate display; and
   c) visualized data sets comprising the partially processed intermediate data sets that are further processed by the first processor for immediate display;
   d) whereby the abstract data sets are processed into visualized data sets that are visualized for the user.

3. A system according to claim 1, wherein:
   a) the system further comprises:
      i) a selection module for selecting a data set; and
      ii) an operator module for selecting an algorithmic operator for manipulating the selected data set; and
   b) the system applies the selected algorithmic operator to modify the selected data set or generate at least one new data set.

4. A system according to claim 1, wherein:
   a) the system further comprises:
      i) a selection module for selecting data sets; and
      ii) an operator module for selecting an algorithmic operator for manipulating the selected data sets; and
   b) the system applies the selected algorithmic operator to modify the selected data sets or generate at least one new data set.

5. A system according to claim 4, further comprising a dependency module by which the system determines dependencies between the selected data sets.

6. A system according to claim 5, wherein:
   a) the dependencies are specified by the algorithmic operators that compute the visualization for a cell;
   b) a dependency arises from each cell that the algorithmic operator uses as an operand and to each cell that the algorithmic operator uses as a target;
   c) the class of the dependency depends on the class of the operator; and
   d) the system determines the dependencies based on an application of the algorithmic operators.

7. A system according to claim 4, further comprising a dependency module by which the system automatically determines dependencies between the selected data sets, wherein:

a) the dependencies are specified by the algorithmic operators that compute the visualization for a cell;

b) a dependency arises from each cell that the algorithmic operator uses as an operand and to each cell that the algorithmic operator uses as a target;

c) the class of the dependency depends on the class of the operator; and d) the system determines the dependencies based on an application of the algorithmic operators.

8. A system according to claim 3, wherein the operator module is configured to select the algorithmic operator from the group of data operators, data transformation operators, analytical representation operators, visualization transformation operators, visualization representation operators, visual mapping transformation operators, and view operators.

9. A system according to claim 3, wherein the operator module is configured to select the algorithmic operator including data operators, data transformation operators, analytical representation operators, visualization transformation operators, visualization representation operators, visual mapping transformation operators, and view operators.

10. A system according to claim 6, wherein the system is configured to use the dependency module to propagate an operation of the algorithmic operator based on the dependencies, wherein:

a) the dependencies for the cells specified as operands of the algorithmic operator automatically initiate execution of algorithmic operators that compute an appropriate value for each cell;

b) the dependencies for the cells specified as targets of the algorithmic operator automatically propagate the values computed by the algorithmic operator, and invoke operations that use the target cells as operands; and c) the dependency module is searched for cycles, and the cycles are eliminated;

d) whereby the system can automatically propagate appropriate changes in values of cells based on the application of the algorithmic operator, and the dependencies generated by the dependency module.

11. A system according to claim 1, wherein the memory is configured with a data structure for maintaining an arrangement of cells having more than two dimensions.

12. A system according to claim 1, further comprising a plurality of processors configured to map attributes of the data sets into visual representations of the data sets.

13. A method of analyzing data organized into data sets and for transforming the data sets into a visual representation of the data sets, the method comprising:

e) maintaining an arrangement of cells in a grid of rows and columns and for storing the data sets, wherein a data set is stored in a single cell;

f) mapping attributes of the data sets into visual representations of the data sets; and g) displaying the visual representations of the data sets in the cells;

h) whereby a user can extract meaning from the data by visually comprehending the relationships between the data sets.

14. A method according to claim 13, wherein the data sets are selected from the group of:

a) abstract data sets comprising unprocessed data sets;

b) intermediate data sets comprising abstract data sets that are partially processed by the first processor but are not ready for immediate display; and c) visualized data sets comprising the partially processed intermediate data sets that are further processed by the first processor for immediate display;

d) whereby the abstract data sets are processed into visualized data sets that are visualized for the user.

15. A method according to claim 13, further comprising:

a) selecting a data set;

b) selecting an algorithmic operator for manipulating the selected data set; and c) applying the selected algorithmic operator to modify the selected data set or generate at least one new data set.

16. A method according to claim 13, further comprising:

a) selecting data sets;

b) selecting an algorithmic operator for manipulating the selected data sets; and c) applying the selected algorithmic operator to modify the selected data sets or generate at least one new data set.

17. A method according to claim 16, further comprising a step of determining dependencies between the selected data sets.

18. A method according to claim 17, further comprising a step of propagating an operation of the algorithmic operator based on the dependencies.

19. A computer-readable medium encoded with data representing a computer program which can cause a computer, having memory and an output device, to analyze data organized into data sets and for transforming the data sets into a visual representation of the data sets, the computer program comprising a method for:

a) maintaining an arrangement of cells in a grid of rows and columns and for storing the data sets, wherein a data set is stored in a single cell;

b) mapping attributes of the data sets into visual representations of the data sets; and c) displaying the visual representations of the data sets in the cells;

d) whereby a user can extract meaning from the data by visually comprehending the relationships between the data sets.

20. A computer-readable medium according to claim 19, wherein the data sets are selected from the group of:

a) abstract data sets comprising unprocessed data sets;

b) intermediate data sets comprising abstract data sets that are partially processed by the first processor but are not ready for immediate display; and c) visualized data sets comprising the partially processed intermediate data sets that are further processed by the first processor for immediate display;

d) whereby the abstract data sets are processed into visualized data sets that are visualized for the user.

21. A computer-readable medium according to claim 19, the method further comprising:

a) selecting a data set;

b) selecting an algorithmic operator for manipulating the selected data set; and c) applying the selected algorithmic operator to modify the selected data set or generate at least one new data set.

22. A computer-readable medium according to claim 19, the method further comprising:

a) selecting data sets;

b) selecting an algorithmic operator for manipulating the selected data sets; and c) applying the selected algorithmic operator to modify the selected data sets or generate at least one new data set.

23. A computer-readable medium according to claim 22, the method further comprising a step of determining dependencies between the selected data sets.

24. A computer-readable medium according to claim 23, the method further comprising a step of propagating an operation of the algorithmic operator based on the dependencies.

* * * * *